S. B. GOFF.
STEAMER.
APPLICATION FILED JAN. 19, 1912.
1,026,390.
Patented May 14, 1912.
2 SHEETS—SHEET 2.
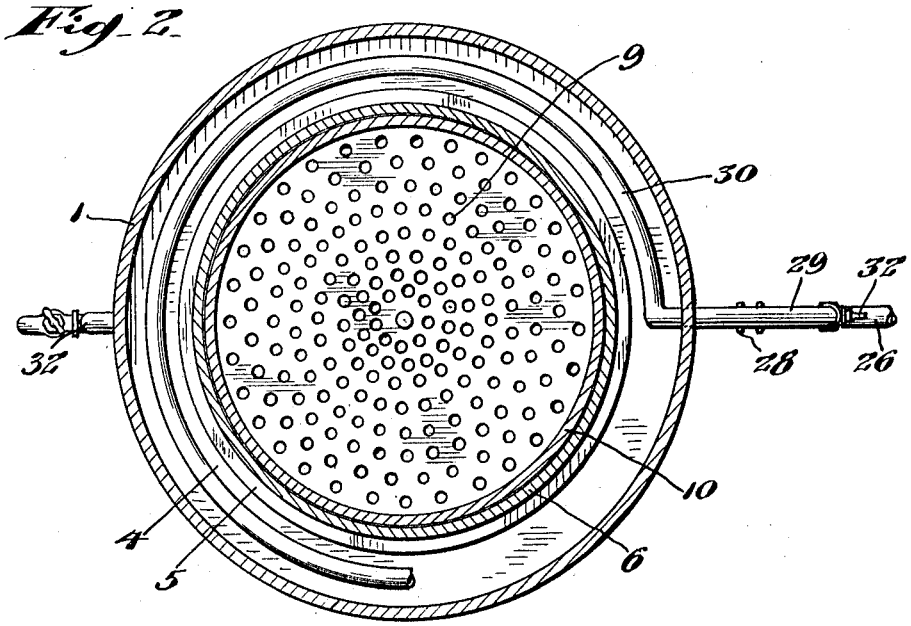
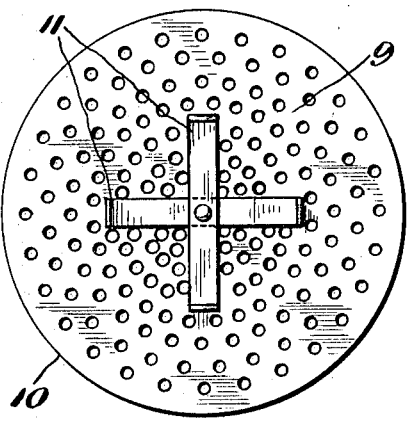
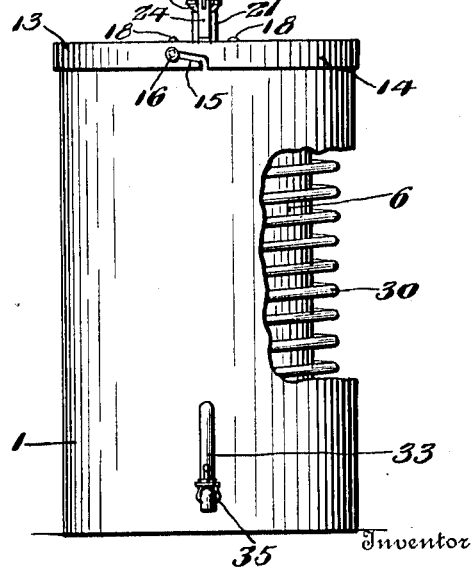
Witnesses
Thno. Rosemann.
R. H. Krenkel.
Inventor
Samuel B. Goff,
By Joshua R. H. Potts.
Attorney
COLUMBIA PLANOGRAPH CO., WASHINGTON, D. C.

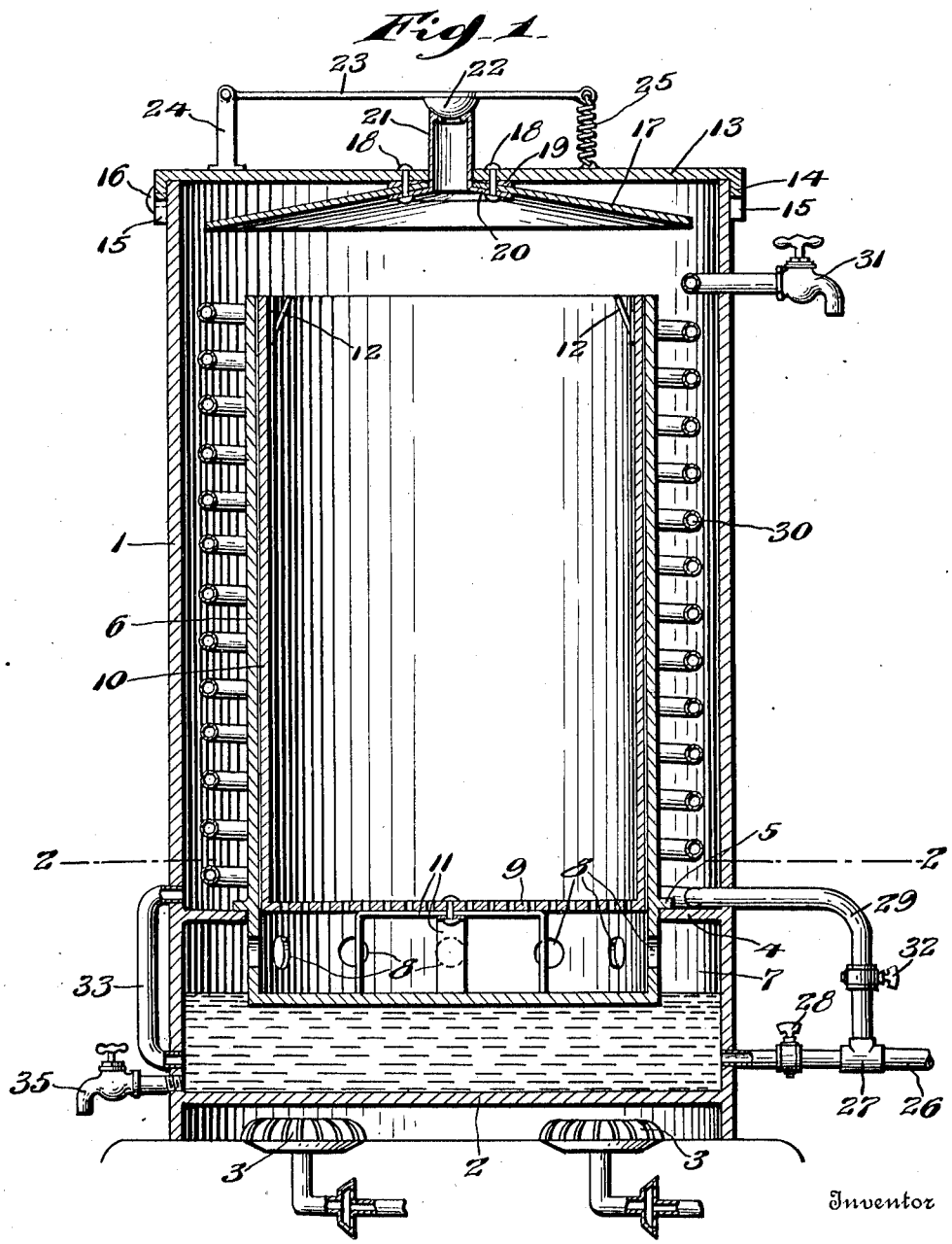

UNITED STATES PATENT OFFICE.

SAMUEL B. GOFF, OF CAMDEN, NEW JERSEY.

STEAMER.

1,026,390.  Specification of Letters Patent.  Patented May 14, 1912.

Application filed January 19, 1912. Serial No. 672,141.

*To all whom it may concern:*

Be it known that I, SAMUEL B. GOFF, a citizen of the United States, residing at Camden, in the county of Camden and State of New Jersey, have invented certain new and useful Improvements in Steamers, of which the following is a specification.

My invention relates to improvements in steamers, the object of the invention being to provide an improved apparatus in which herbs, food products, or other vegetable matter may be thoroughly steamed.

A further object is to provide an improved construction of apparatus embodying in its lower portion, a boiler from which the steam passes upwardly through a suitable receptacle containing the material to be steamed, and condenses in the upper portion of the apparatus and the water as a result of such condensation falls down the outside of the receptacle, and finds its way back into the boiler, and during such passage serves to heat a water coil.

With these and other objects in view, the invention consists in certain novel features of construction and combinations and arrangements of parts, as will be more fully hereinafter described and pointed out in the claims.

In the accompanying drawings: Figure 1, is a view in vertical longitudinal section illustrating my improvements. Fig. 2, is a view in section on the line 2—2 of Fig. 1. Fig. 3, is a bottom plan view of the receptacle 10, and Fig. 4, is a view in side elevation partly broken away illustrating the coil within the tank.

1, represents a tank preferably of cylindrical form, and having its bottom 2 spaced above its lower end, whereby a chamber is formed into which suitable Bunsen burners 3 may be positioned to thoroughly heat the tank. Tank 1 is provided near its lower end, with an internal annular flange 4 upon which is supported an annular flange 5 on the outside of a cylindrical casing 6. Casing 6 is of appreciably less diameter than tank 1, and its lower end is spaced from the bottom 2, so that a boiler chamber 7 is formed between flange 4, the bottom of the casing 6 and the lower end of tank 1. The casing 6, below flange 5, is provided with a circular series of openings 8 through which steam from the boiler enters said casing, and it passes upwardly through the perforated bottom 9 of a cooking receptacle 10.

This receptacle 10 is cylindrical in form, and snugly fits within casing 6, and on its bottom angular frames 11 are secured at right angles to each other, and constitute feet which support the cooking receptacle above the perforations 8, so as to allow the steam a free entrance into the casing below the perforated bottom of said cooking receptacle. Suitable handles 12 are provided inside of the receptacle 10 at its upper end to facilitate its removal with the contents thereof, and a cover 13 is provided to close the upper end of the tank. This cover 13 has an annular flange 14 which snugly fits the tank, and at opposite sides is made with cam grooves 15 to receive pins 16 on the tank, and constitute bayonet joints which, when the top is turned, tightly secure the top in place. A conical disk 17 larger in diameter than casing 6, is secured to the under face of top 13 by means of rivets 18, and these rivets extend through a spacing washer 19 between the top 13 and the disk, and also through an annular flange 20 on the lower end of a tube 21. This tube 21 extends through an opening in the top 13, through the washer 19, and through a central opening in the disk 17, and at its lower end the flange 20 is flared outwardly against the under face of said disk, and when the rivets 18 are driven through the flange, the disk, the washer, and the top, the parts are rigidly secured together and form a steam tight juncture. The tube 21 which extends above the top 13, constitutes an outlet for steam which is normally closed by a valve 22 on a lever 23. This lever 23 is fulcrumed at one end in a bracket 24 on top 13, and at its other end is connected to said top by a coiled spring 25 which exerts pressure on the lever to hold the valve in closed position. If the pressure of steam becomes excessive in the tank, this valve will open to allow it to escape, before it reaches the danger point.

26, represents a water supply pipe adapted to be connected to the city supply system, and communicates with the boiler chamber 7. A T-coupling 27 is located in this pipe 26, and between this T-coupling and tank 1, a valve 28 is provided to control the supply of water to the boiler. A branch pipe 29 is connected to the T-coupling 27, and connects the same with a coil 30 located in tank 1, and extending around the outside of casing 6 from the flange 4 to a point adjacent the upper end of said casing, where it extends through the wall of said tank, and is provided with a spigot 31 from which the water may be drawn. A valve 32 is located in the pipe 29, and controls the supply of water to the coil. A pipe 33 connects the tank 1 above flange 4 with the boiler portion 7 of said tank below the flange, so that water may return to the boiler as will now be explained.

The burners 3 heat the water in boiler 7, and generate steam. The steam passes through the openings 8, thence up through the perforated bottom 9, and through the contents of receptacle 10. The steam then strikes the disks 17 and condenses. The drops of water which form on this disk 17 move along the disk until they fall off the outer edge of the disk, which is over the space between the tank 1 and casing 6, and directly in line with the convolutions of coil 30. This water is, of course, hot, and as it drops down upon the coil, heats the water in the coil, so that the water which is drawn from spigot 31 is hot, and this apparatus serves the function not only of a steamer, but also that of a water heater. The coil containing relatively cold water also acts to assist in condensing the steam, and the water which is the result of such condensation, falls down to the bottom of the chamber between casing 6 and tank 1 onto flange 4, and finds its way through pipe 33 into the boiler chamber 7, and is again used. The water is therefore used over and over again, and while, it is of course, necessary from time to time to open valve 28 to make up for losses in the system, a relatively small amount of water may be used over and over again, and if at any time the pressure of steam becomes dangerous, the valve 22 will automatically open and allow steam to escape and reduce the pressure.

In order that the boiler may be thoroughly drained, and a new supply of water furnished, a suitable spigot 35 is located in the wall of tank 1 as clearly shown.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An apparatus of the character described, comprising a tank, an internal annular flange in said tank at a point removed from the bottom thereof, a casing smaller than the tank, a flange around the outside of said casing, supported on said first-mentioned flange, said casing having perforations in its sides below the flange, a receptacle fitting within the casing and having a perforated bottom, and feet secured to said bottom and spacing it from the casing above the perforations in the latter, substantially as described.

2. An apparatus of the character described, comprising a tank, an internal annular flange in said tank at a point removed from the bottom thereof, a casing smaller than the tank, a flange around the outside of said casing, supported on said first-mentioned flange, said casing having perforations in its sides below the flange, a receptacle fitting within the casing and having a perforated bottom, feet secured to said bottom and spacing it from the casing above the perforations in the latter, a cover on said tank, a disk secured to the under face of the cover and larger in diameter than the casing, and a pipe connecting the tank above and below the internal flange therein, substantially as described.

3. An apparatus of the character described, comprising a tank, an internal annular flange in said tank at a point removed from the bottom thereof, a casing smaller than the tank, a flange around the outside of said casing, supported on said first-mentioned flange, said casing having perforations in its sides below the flange, a receptacle fitting within the casing and having a perforated bottom, feet secured to said bottom and spacing it from the casing above the perforations in the latter, a cover on said tank, a disk secured to the under face of the cover and larger in diameter than the casing, a pipe connecting the tank above and below the internal flange therein, said disk and cover having central openings, a tube secured in said central openings, a bracket on the cover, a lever pivoted at one end to the bracket, a valve on said lever engaging the upper end of the tube, and means for exerting downward pressure on the free end of said lever, substantially as described.

4. An apparatus of the character described, comprising a tank, an internal annular flange in said tank at a point removed from the bottom thereof, a casing smaller than the tank, a flange around the outside of said casing, supported on said first-mentioned flange, said casing having perforations in its sides below the flange, a receptacle fitting within the casing and having a perforated bottom, and feet secured to said bottom and spacing it from the casing above the perforations in the latter, a water pipe communicating with the lower end of said tank, a T-coupling in said pipe, a valve between the T-coupling and the tank, a cover on said tank, a disk secured to the under face of the cover and larger in diameter than the casing, a coil in the tank around the receptacle and in line with the outer edge of said disk, a pipe connecting the lower end of said coil with said T-coupling, a valve in said last-mentioned pipe, and a spigot outside of the tank and communicating with the upper end of the coil, substantially as described.

5. An apparatus of the character described, comprising a tank, an internal annular flange in said tank at a point removed from the bottom thereof, a casing smaller than the tank, a flange around the outside of said casing, supported on said first-mentioned flange, said casing having perforations in its sides below the flange, a receptacle fitting within the casing and having a perforated bottom, feet secured to said bottom and spacing it from the casing above the perforations in the latter, a cover on said tank, a disk secured to the under face of the cover and larger in diameter than the casing, a pipe connecting the tank above and below the internal flange therein, a water pipe communicating with the lower end of said tank, a T-coupling in said pipe, a valve between the T-coupling and the tank, a coil in the tank around the receptacle and in line with the outer edge of said disk, a pipe connecting the lower end of said coil with said T-coupling, a valve in said last-mentioned pipe, and a spigot outside of the tank and communicating with the upper end of the coil, substantially as described.

6. An apparatus of the character described, comprising a tank, an internal annular flange in said tank at a point removed from the bottom thereof, a casing smaller than the tank, a flange around the outside of said casing, supported on said first-mentioned flange, said casing having perforations in its sides below the flange, a receptacle fitting within the casing and having a perforated bottom, feet secured to said bottom and spacing it from the casing above the perforations in the latter, a cover on said tank, a disk secured to the under face of the cover and larger in diameter than the casing, a pipe connecting the tank above and below the internal flange therein, said disk and cover having central openings, a tube secured in said central openings, a bracket on the cover, a lever pivoted at one end to the bracket, a valve on said lever engaging the upper end of the tube, means for exerting downward pressure on the free end of said lever, a water pipe communicating with the lower end of said tank, a T-coupling in said pipe, a valve between the T-coupling and the tank, a coil in the tank around the receptacle and in line with the outer edge of said disk, a pipe connecting the lower end of said coil with said T-coupling, a valve in said last-mentioned pipe, and a spigot outside of the tank and communicating with the upper end of the coil, substantially as described.

7. An apparatus of the character described, comprising a tank, an internal annular flange in said tank at a point removed from the bottom thereof, a casing smaller than the tank, a flange around the outside of said casing, supported on said first-mentioned flange, said casing having perforations in its sides below the flange, a receptacle fitting within the casing and having a perforated bottom, feet secured to said bottom and spacing it from the casing, above the perforations in the latter, a cover on said tank, a disk secured to the under face of the cover and larger in diameter than the casing, a pipe connecting the tank above and below the internal flange therein, the bottom of said tank positioned above its lower edge, whereby a burner receiving chamber is formed, a flange around the outer edge of said cover having cam grooves therein, and pins fixed to said tank and adapted to be positioned in said grooves, whereby the cover is clamped on the tanks, substantially as described.

In testimony whereof I have signed my name to this specification in the presence of two subscribing witnesses.

SAMUEL B. GOFF.

Witnesses:
S. W. FOSTER,
C. R. ZIEGLER.

---

Copies of this patent may be obtained for five cents each, by addressing the "Commissioner of Patents, Washington, D. C."